United States Patent
Abou Rjeili et al.

(10) Patent No.: US 9,432,513 B2
(45) Date of Patent: *Aug. 30, 2016

(54) LOCAL VOICEMAIL FOR MOBILE DEVICES

(71) Applicant: Microsoft Corporation, Redmond, WA (US)

(72) Inventors: Joe Abou Rjeili, Redmond, WA (US); Jean Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,941

(22) Filed: Mar. 28, 2013

(65) Prior Publication Data

US 2014/0128038 A1    May 8, 2014

Related U.S. Application Data

(63) Continuation of application No. 12/769,669, filed on Apr. 29, 2010, now Pat. No. 8,412,163.

(51) Int. Cl.
*H04M 11/10* (2006.01)
*H04M 3/533* (2006.01)
*H04M 1/65* (2006.01)
(Continued)

(52) U.S. Cl.
CPC .......... *H04M 3/533* (2013.01); *H04M 1/6505* (2013.01); *H04W 4/12* (2013.01); *H04W 4/16* (2013.01)

(58) Field of Classification Search
CPC ..... H04L 12/58; H04L 51/36; H04L 12/589; H04L 51/04; H04L 61/1564; H04M 3/533; H04M 1/6505; H04W 4/12; H04W 4/16

USPC .............. 455/550.1, 414.1, 415, 413, 412.1, 455/412.2, 418; 726/16; 709/206

See application file for complete search history.

(56) References Cited

U.S. PATENT DOCUMENTS

| | | | |
|---|---|---|---|
| 6,535,743 B1 * | 3/2003 | Kennedy et al. | 455/456.1 |
| 8,666,034 B2 * | 3/2014 | Christie, IV | H04M 3/436 379/202.01 |
| 2003/0152201 A1 | 8/2003 | Snelgrove et al. | |

(Continued)

FOREIGN PATENT DOCUMENTS

| CA | EP 2031841 A1 * | 3/2009 | ........... H04M 1/642 |
|---|---|---|---|
| CN | 1141544 | 1/1997 | |

(Continued)

OTHER PUBLICATIONS

"Foreign Office Action", CN Application No. 201110118250.1, Jul. 23, 2014, 11 Pages.

(Continued)

*Primary Examiner* — Khai M Nguyen
(74) *Attorney, Agent, or Firm* — Fehmi Chebil; Micky Minhas (57) ABSTRACT

This document describes various techniques for implementing local voicemail on a mobile device. These techniques may include enabling the mobile device to answer a voice call, record audio of the voice call to provide a voicemail file, and store the voicemail file to local computer-readable media. A locally stored voicemail file may be associated with relevant data, exposed via the associated data for local processing, and/or manipulated through a user interface of the mobile device.

20 Claims, 5 Drawing Sheets

(51) Int. Cl.
*H04W 4/16* (2009.01)
*H04W 4/12* (2009.01)

(56) References Cited

U.S. PATENT DOCUMENTS

| | | | |
|---|---|---|---|
| 2005/0191969 A1* | 9/2005 | Mousseau | H04M 1/6505 455/90.2 |
| 2008/0261564 A1* | 10/2008 | Logan | 455/413 |
| 2009/0106059 A1 | 4/2009 | Megiddo et al. | |
| 2009/0298529 A1* | 12/2009 | Mahajan | 455/550.1 |
| 2010/0273443 A1* | 10/2010 | Forutanpour et al. | 455/404.1 |
| 2011/0219080 A1* | 9/2011 | McWithey et al. | 709/206 |
| 2014/0090050 A1* | 3/2014 | Nakajima et al. | 726/16 |

FOREIGN PATENT DOCUMENTS

| | | |
|---|---|---|
| CN | 101004808 A | 7/2007 |
| CN | 101378424 | 3/2009 |
| EP | 2031841 A1 * | 3/2009 |

OTHER PUBLICATIONS

"Foreign Office Action", CN Application No. 201110118250.1, Jan. 23, 2014, 10 Pages.

"Foreign Office Action", CN Application No. 201110118250.1, Mar. 12, 2013, 11 pages.

"Foreign Office Action", CN Application No. 201110118250.1, Feb. 15, 2015, 10 Pages.

Fifth Office Action and Search Report Issued in Chinese Patent Application No. 201110118250.1, Mailed Date: Aug. 18, 2015, 15 pages.

Sixth Office Action Issued in Chinese Patent Application No. 201110118250.1, Mailed Date: Nov. 30, 2015, 6 pages.

* cited by examiner

LOCAL VOICEMAIL FOR MOBILE DEVICES

RELATED APPLICATIONS

This application is a continuation of and claims priority under 35 U.S.C. §120 to U.S. patent application Ser. No. 12/769,669 filed Apr. 29, 2010 and titled "Local Voicemail for Mobile Devices," the disclosure of which is incorporated by reference herein in its entirety.

BACKGROUND

Network-based voicemail systems often limit a user's ability to access, store, and manage voicemail from a mobile device. Storing voicemail on a network limits access to voicemail based on network availability, restricts the amount of voicemail that can be stored, and provides few options for archiving voicemail. Additionally, voice-driven menu systems typically employed by network-based voicemail systems are cumbersome, making retrieval, navigation, and management of voicemail difficult and time consuming.

SUMMARY

This document describes various techniques for implementing local voicemail on a mobile device, such as by enabling the mobile device to answer a voice call, record audio of the voice call to provide a voicemail file, and store the voicemail file to local computer-readable media. A locally stored voicemail file may be associated with relevant data, exposed via the associated data for local processing, and/or manipulated through a user interface of the mobile device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various techniques for implementing local voicemail on a mobile device. In some embodiments, these techniques enable the mobile device to answer a voice call, record audio of the voice call to provide a voicemail file, and store the voicemail file to local computer-readable media. Relevant data accessible to the mobile device may be associated with the stored voicemail file. The stored voicemail file may be exposed via the associated data for local processing and/or manipulation through a user interface of the mobile device. In some embodiments a decision to answer the voice call is based on information accessible to the mobile device. In other embodiments, answering the voice call is responsive to input received from a user of the mobile device. Various embodiments of these techniques result in locally stored voicemail files, which enable a user to efficiently access, navigate, and manage the voicemail files at a mobile device without accessing a network.

Example Environment

Figure 1:
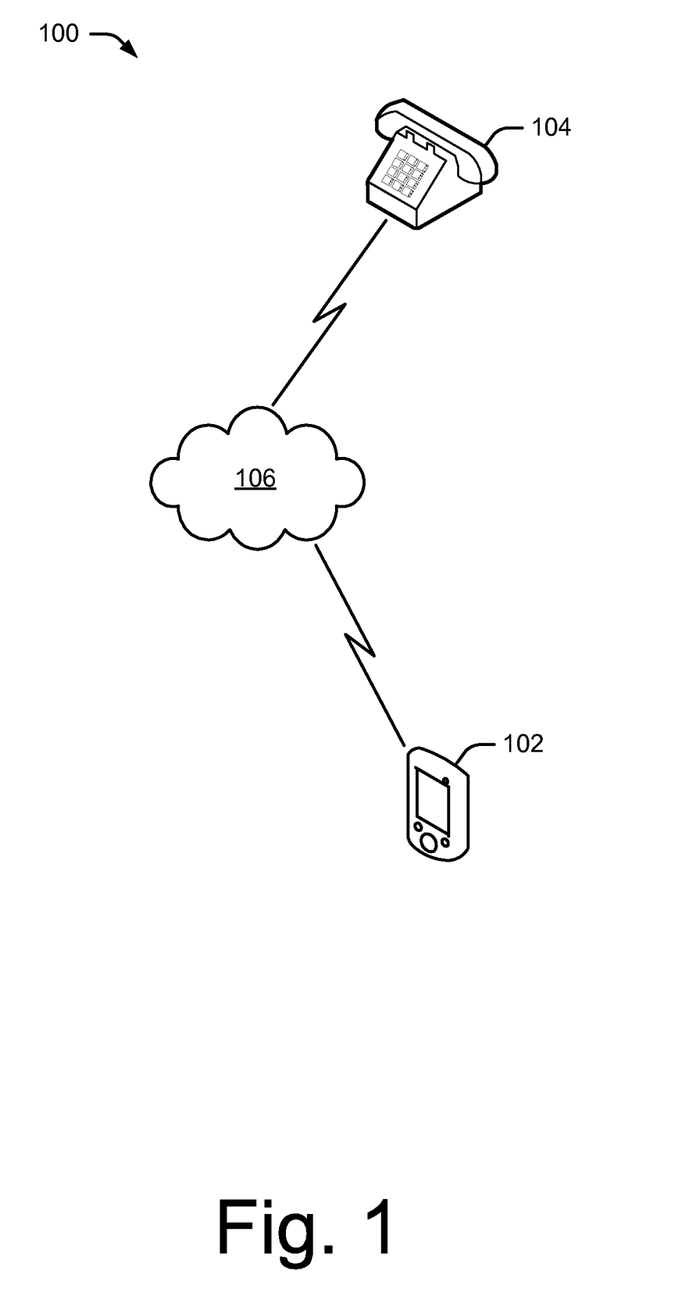
FIG. 1 illustrates an example environment in which techniques for local voicemail are implemented.

FIG. 1 is an illustration of an example environment 100 in which techniques for local voicemail are implemented. Environment 100 includes a mobile device 102, a calling entity 104, and a wireless network 106 through which mobile device 102 may make and/or receive voice calls. Generally, mobile device 102 receives voice calls from calling entity 104 through wireless network 106.

Mobile device 102 can be any device capable of receiving voice calls over a wireless network (e.g., wireless network 106), recording audio of voice calls, and storing audio to local computer-readable media. In the present example, mobile device 102 is illustrated as a smart-phone. While not shown, mobile device 102 may comprise other devices, such as a cellular phone, a cordless phone, a wireless Voice-over-IP phone, or a voice-capable personal media device, to name a few. Calling entity 104 may comprise any entity capable of initiating a voice call and communicating audibly over the voice call.

Wireless network 106 may include any suitable network such as a cellular network, a wireless local-area network, a wireless wide-area network, and/or a short range wireless-network, to name a few. Additionally, in at least some instances, wireless network 106 may be managed by a communication service provider, such as a cellular service provider, Internet service provider, and/or Voice-over-IP provider in order to facilitate voice communication for any type of wireless mobile device or mobile phone. In instances where a communication service provider manages a wireless network, the communication service provider may implement a network-based voicemail system.

Figure 2:
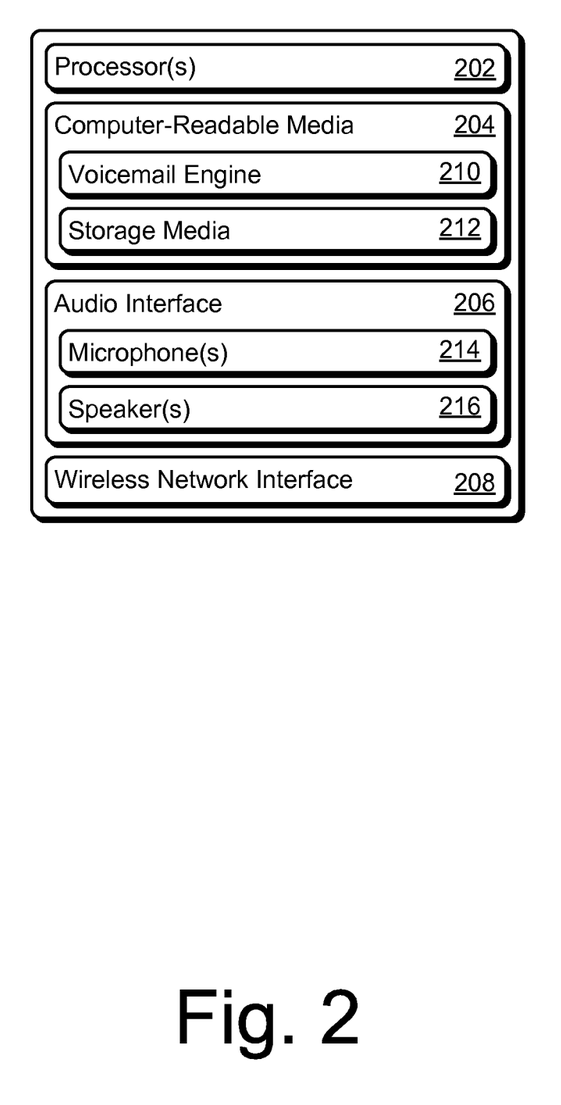
FIG. 2 illustrates an example of the mobile device of FIG. 1.

FIG. 2 illustrates a detailed example of mobile device 102 of FIG. 1. Mobile device 102 includes processor(s) 202, computer-readable media (CRM) 204, audio interface 206, and wireless network interface 208. Computer-readable media 204 contains voicemail engine 210 and storage media 212. How voicemail engine 210 is implemented and used varies, and is described as part of the processes discussed below. Storage media 212 includes internal and/or external (but local) memory and is capable of storing data. Audio interface 206 includes microphone(s) 214 capable of capturing audio and speaker(s) 216 capable of generating audible output. Audio interface 206 may be implemented natively on mobile device 102 and/or via any wired or wireless audio device such as wireless personal-area-network ear piece.

Generally, any of the techniques and abilities described herein can be implemented using software, firmware, hardware (e.g., fixed-logic circuitry), manual processing, or any suitable combination of these implementations. The example mobile device 102 generally represents software, firmware, hardware or any combination thereof. In the case of a software implementation, for instance, voicemail engine 210 represents computer-executable instructions (e.g., program code) that perform specific tasks when executed on a processor (e.g., CPU or CPUs). The program code can be stored in one or more computer-readable memory devices, such as computer-readable media 204 (e.g. storage media 212). The features and techniques described herein are platform-independent, meaning that they may be implemented on a variety of commercial computing platforms having a variety of processors.

Example Processes

The following discussion describes techniques for implementing local voicemail on a mobile device. Generally, these techniques enable a mobile device to answer a voice call, record audio of the voice call to provide a voicemail file, and store the voicemail file to local computer-readable media. For example, mobile device 102 answers a voice call from calling entity 104 received through wireless network 106, records audio of the voice call to provide a voicemail file, and stores the voicemail file to local computer-readable media. In some embodiments, relevant data may be associated with a local voicemail file, the voicemail file may be exposed via the associated data for local processing and/or the voicemail file may be manipulated by a user interface of a mobile device.

Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 as well as example entities of environment 100 illustrated in FIG. 2.

Figure 3:
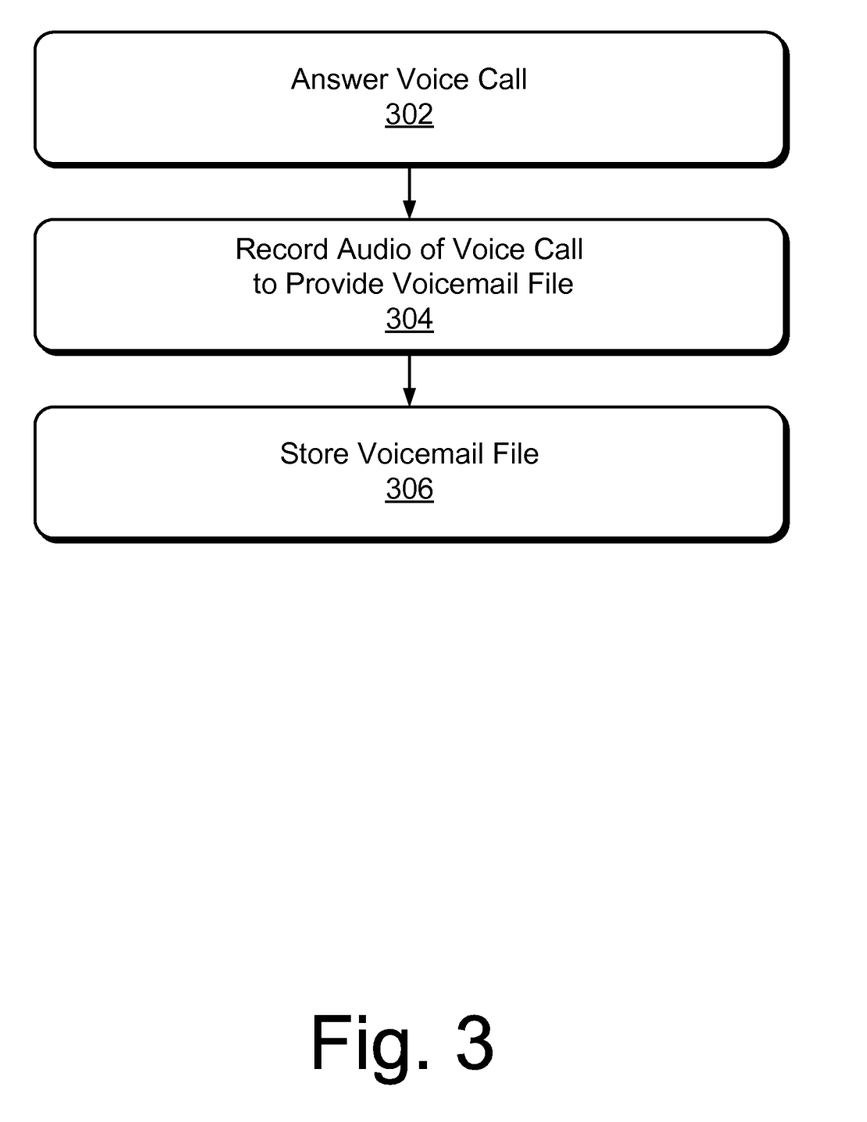
FIG. 3 is a flow diagram depicting an example process for recording audio of a voice call to provide a voicemail file.

FIG. 3 is a flow diagram depicting an example process 300 for recording a voice call to provide a voicemail file. Block 302 answers a voice call at a mobile device. In some cases, answering the voice call is responsive to user input received at the mobile device. For instance, block 302 may answer the voice call responsive to user input indicating the voice call should be sent to local voicemail. Optionally, a decision at block 302 to answer the call may be based on information accessible to the mobile device. Examples of information accessible to the mobile device include schedule, calendar, contact, and mobile device location, to name a few.

In some cases a microphone of the mobile device is disabled preventing unintentional transmissions of sound and/or ambient noise over the voice call. Optionally, an audio message may be played from local storage of the mobile device over the voice call. For instance, the audio message may be a default voicemail greeting or a custom voicemail greeting recorded by a user of the mobile device.

By way of example, consider process 300 in the context of environment 100. Voicemail engine 210 answers, at block 302, a voice call received from calling entity 104 through wireless network 106. Here assume that mobile device 102 has access to calendar information which indicates a user of mobile device 102 has a meeting scheduled at the time of the voice call. Continuing the present example, voicemail engine 210 decides to answer the voice call based on calendar information.

Also assume that a default voicemail greeting is stored on storage media 212 of mobile device 102. In the present example, voicemail engine 210 disables microphone 214 of mobile device 102 and plays the custom voicemail greeting from media storage 212 over the voice call to calling entity 104.

Block 304 records audio of the voice call to provide a voice mail file. In some cases recording begins after an audio message is played from local storage over the voice call. Recording of audio at block 304 may cease responsive to the voice call ending, a recording length timeout, or an audio recording cache limit. For instance, the audio recording cache limit may be based on available capacity of local storage media.

Continuing the ongoing example, voicemail engine 210 records audio of the voice call after the custom voicemail greeting has been played from storage media 212 over the voice call. Here assume that calling entity 104 leaves a message for the user of mobile device 102 and hangs up, ending the voice call. For the ongoing example, voicemail engine records the message from calling entity 104 until the end of the voice call, providing a voicemail file of the message from calling entity 104.

Block 306 stores the voicemail file locally on the mobile device. In some cases, details about the voice call may be associated with the voicemail file, such as a time of the voice call, duration of the audio recorded from the voice call, and/or a telephone number from which the voice call originated. Optionally, relevant data accessible to the mobile device may be associated with the stored voicemail file. Examples of relevant data include contact data, calendar data, tasks, images, call history data, short-message-service (SMS) messages, multimedia-message-service (MMS) messages, and email to name a few. For instance, contact information may be associated with a voicemail file based on associated details such as a phone number.

In some cases, the voicemail file may be exposed via the associated data for local processing. A synchronization application of the mobile device may be configured to synchronize voicemail files from a particular contact to an Internet-based or cloud-based user account for archiving and/or online management. In other instances, a calendar application may be configured to associate voicemail files received from attendees of an event with the event in the calendar application.

Continuing with the ongoing example, voicemail engine 210 stores the voicemail file of the message from calling entity 104 to storage media 212 of mobile device 102. Here assume mobile device 102 has access to contact data relating to calling entity 104 including a name, address, phone number, email address, and an image. In the context of the current example, voicemail engine 210 associates contact data relating to calling entity 104 with the voicemail file. The voicemail file may then be exposed through the contact data relating to calling entity 104 for use in other applications, syncing, archiving, and/or manipulation by a user interface of mobile device 102. Concluding the above example, a voicemail alert is displayed on device 102 including the name and image associated with calling entity 104 enabling user interaction with the voicemail file.

Figure 4:
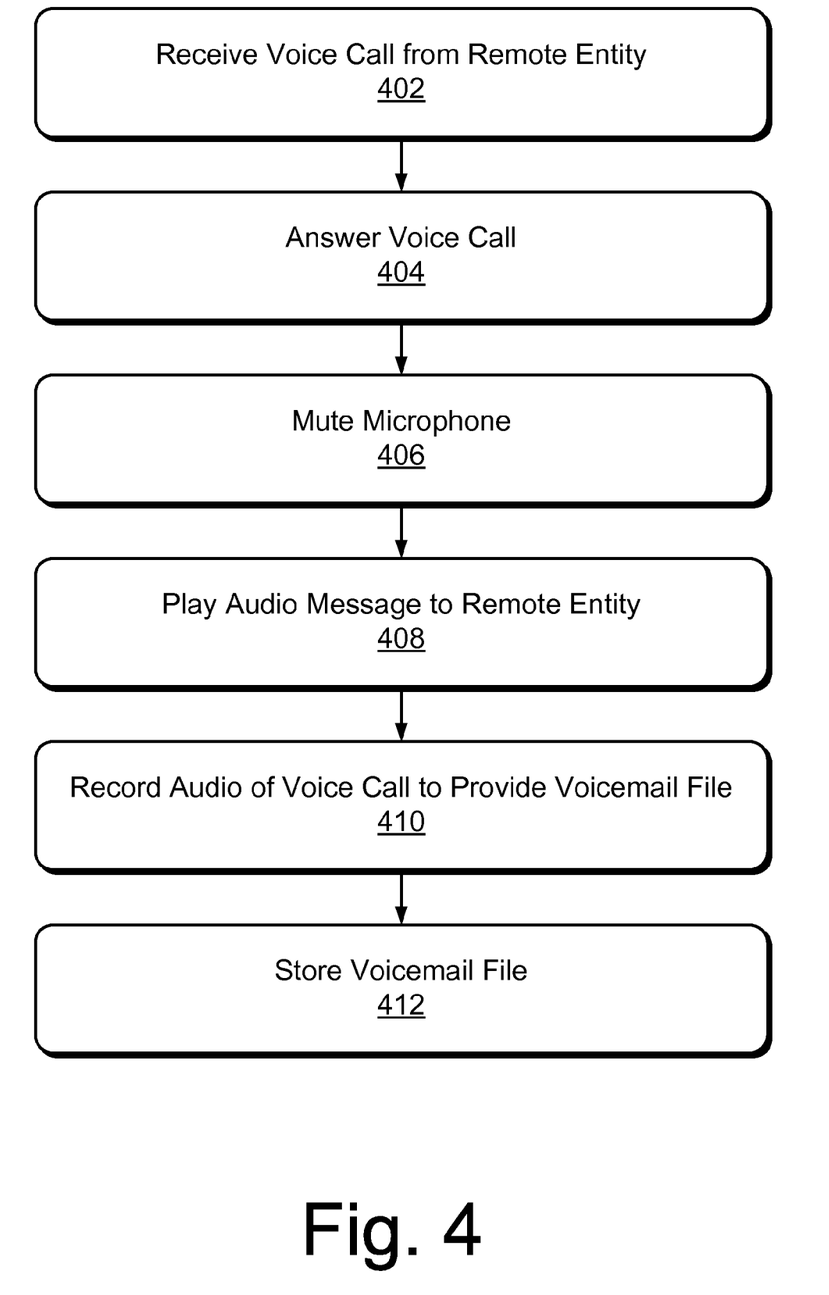
FIG. 4 is a flow diagram depicting an example process for implementing local voicemail at a mobile device.

FIG. 4 is a flow diagram depicting an example process 400 for implementing local voice mail on a mobile device. Block 402 receives a voice call, at a mobile device, from a remote entity. By way of example, consider process 400 in the context of environment 100. Here mobile device 102 receives a voice call from calling entity 104 through wireless network 106.

Block 404 answers the voice call from the remote entity. In some cases answering is responsive to a setting of the mobile device. Settings related to answering the voice call may be default, pre-defined, set by a user, determined from information accessible to the mobile device, or any combination thereof. For instance, block 404 may answer the voice call after a pre-defined number of rings in accordance with a default setting of the mobile device. In other instances, block 404 may answer the voice call immediately when a ring volume setting of the mobile device is set to a particular ring level, such as silent, or ring type, such as vibration.

Optionally, settings may be determined based on information accessible to the mobile device. Examples of information used in determining settings may include calendar, contact, schedule, and location information to name a few. For instance, block 404 may answer the voice call immediately in accordance with a location setting determined from information indicating the mobile device is proximate a movie theater.

In other cases, block 404 may answer the voice call responsive to user input received at the mobile device. For instance, block 404 may answer the call responsive to user input directing the received voice call to local voicemail. In some cases, options may be presented on a user interface of the mobile device allowing the user to answer the voice call, direct the call to network based voicemail, direct the voice call to local voicemail, or listen as the voice call is recorded locally as discussed below.

Continuing the present example, voicemail engine 210 answers the voice call received from calling entity 104. Here assume that voicemail engine 210 answers the voice call responsive to user input received at mobile device 102. Also assume that a user of mobile device 102 has chosen to listen to the voice call from remote entity 104 as the voice call is recorded locally.

Block 406 mutes the microphone of the mobile device preventing ambient noise from being transmitted over the voice call. In some cases, a wired or wireless headset associated with the mobile device may also be muted. In the context of the present example, block 406 mutes microphone(s) 214 of mobile device 102.

Block 408 plays an audio message from local storage to the remote caller over the voice call. In some cases the audio message in local storage may be a default voicemail greeting. In other cases the audio message may include a custom voicemail message created by the user of the mobile device saved to local storage. Optionally, local storage may include a plurality of default and/or custom voicemail greetings, played to a remote entity based on information accessible to the mobile device about the remote entity. For instance, block 408 may play a custom business-oriented voicemail greeting to the calling entity based on contact information indicating the calling entity is business related.

Continuing the current example, voicemail engine 210 plays an audio message from storage media 212 to calling entity 104 over the voice call. Here assume that storage media 212 contains several custom business-oriented voicemail greetings for both customers and co-workers of the user of mobile device 102. Also assume that calling entity 104 is a co-worker of the user of mobile device 102, and that mobile device 102 has access to contact data relating to calling entity 104. In the context of the current example, voicemail engine 210 plays the appropriate custom voicemail greeting from storage media 212 over the voice call to calling entity 104 based on the related contact data.

Block 410 records audio of the voice call to provide a voicemail file. Recording of audio at block 304 may cease responsive to the voice call ending, a recording length timeout, or an audio recording cache limit. Optionally, audio of the voice call may be played over a speaker of the mobile device while block 410 records. For example, playing audio of the voice call over a speaker of the mobile device enables a user to screen calls at the mobile device. In some cases the user may mark the voicemail file provided by block 410 for deletion having already listened to the voice call. In other cases, the user may cease process 400 to take the voice call from the calling entity.

Continuing the present example, voicemail engine 210 records audio of the voice call to provide a voicemail file. As noted above in the present example, the user of the mobile device chose to listen to the voice call as voicemail engine 210 recorded. Here assume that calling entity 104 leaves a message for the user of mobile device 102 and hangs up, ending the call. While recording, voicemail engine 210 plays audio of the voice call over speaker(s) 216 of mobile device 102 allowing the user of mobile device 102 to listen to the message being left by calling entity 104.

Block 412 stores the voicemail file on the mobile device. Once stored on the mobile device, the voicemail file may be readily accessed without network connectivity. In some cases, the stored voicemail file may be synchronized or sent to Internet-based or cloud-based storage enabling the voicemail file to be accessed from any Internet-connected computing device. For example, a stored voicemail may be synchronized to a cloud-based user account which a user could then access from any internet connected PC to manage, edit, tag, and/or use the voicemail file for any suitable purpose.

Optionally, relevant data accessible to the mobile device may be associated with the stored voicemail file. Examples of relevant data include contact data, social-network data, messaging-application data, pictures, video clips, other voicemail files, and synchronization data to name a few. In some cases, relevant data may be entered by the user of mobile device 102 for association with a voicemail file. For instance, the user may enter relevant data, such as updated contact information, for association with the voicemail file after listening to the voicemail file.

In some cases, the voicemail file may be exposed via associated data for local processing. For instance, an email application of the mobile device may be configured to email voicemail files from a particular contact to another contact as part of a voicemail forwarding configuration or out-of-office scheme. In other instances, a task management application may be configured to associate voicemail files received from particular contacts with tasks relating to those particular contacts.

Continuing the current example, voicemail engine 210 stores the voicemail file to storage media 212 of mobile device 102. As noted above, mobile device 102 has access to contact data relating to calling entity 104, allowing voicemail engine 210 to associate contact data relating to calling entity 104 with the voicemail file and to expose the voicemail file via the associated data. Here assume that the user of mobile device 102 searches for past call and messaging interactions with calling entity 104 via a user interface of mobile device 102. Concluding the present example, the stored voicemail file, exposed to by the associated data, is presented by contact name and associated image to the user of device 102 for any suitable interaction.

Figure 5:
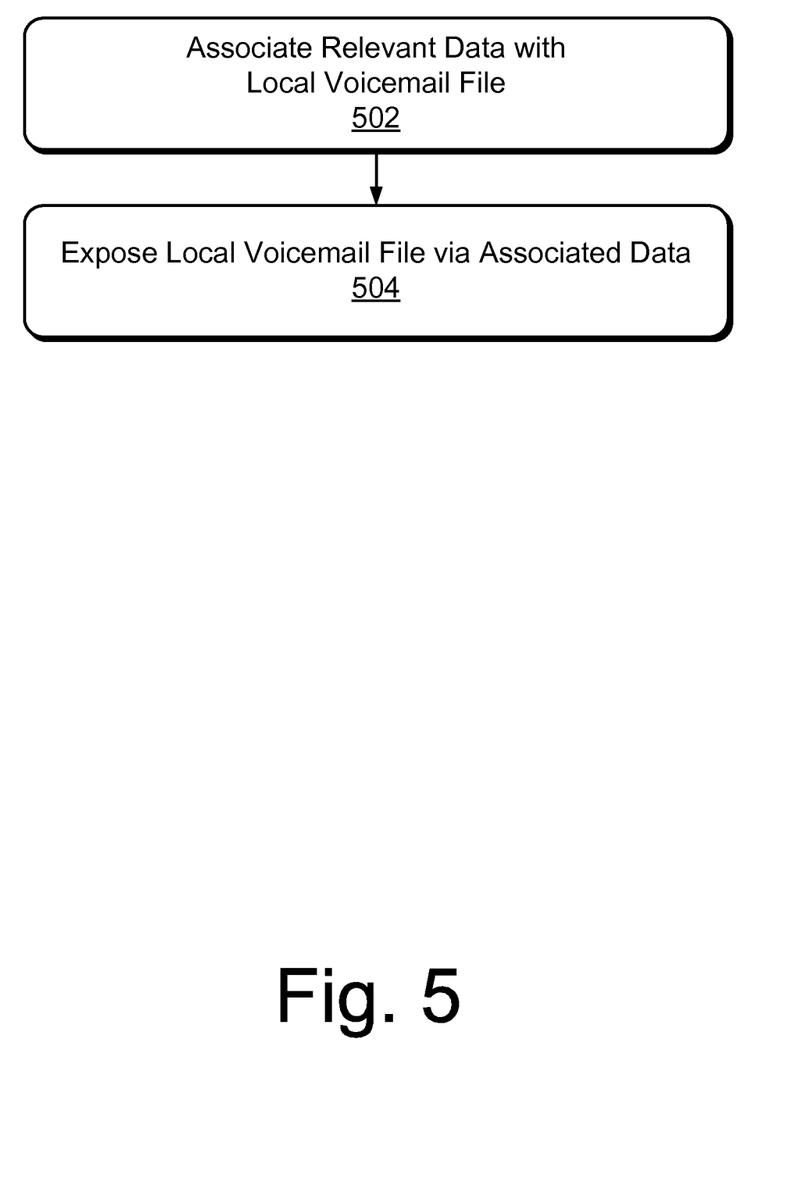
FIG. 5 is a flow diagram depicting an example process exposing a voicemail file via associated data.

FIG. 5 is a flow diagram depicting an example process 500 for exposing a local voicemail file. Block 502 associates relevant data with voice mail file stored on a mobile device. In some cases, relevant data may be stored locally on the mobile device. In other cases, relevant data may be downloaded through a wireless network and/or entered by a user of the mobile device. Examples of relevant data include contact information, schedule events, calendar information, call history, metadata, audio file tags, and/or emails to name a few. It is to be appreciated and understood, however, that data other than the examples provided may be utilized in connection with the principles described herein.

Block 504 exposes the voicemail file via the associated data enabling the voicemail file to be utilized through the associated data. In some cases, a voicemail file may be managed by aspects of the associated data. For example, voicemail files may be searched for, sorted, filtered, and/or navigated by any aspect exposed by the associated data. In other cases, applications of the mobile device may utilize voicemail files through the associated data. For example, voicemail files may be uploaded, synchronized, forwarded, attached to calendar events, emailed, sent as MMS messages, and/or imported into applications based on exposed aspects of the voicemail files.

CONCLUSION

This document describes various techniques for local voicemail at a mobile device. These techniques can enable a mobile device to answer a voice call, record audio of the voice call to provide a voicemail file, and store the voicemail file on the mobile device. In some embodiments a microphone of the mobile device may be muted and/or an audio file may be played over the voice call. In other embodiments, relevant data may be associated with the voicemail file enabling aspects of the voicemail file to be exposed. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    a voicemail engine of a mobile device storing a voicemail file locally on the mobile device, the voicemail file including audio of a voice call received at the mobile device; and
    the voicemail engine associating additional data with the voicemail file, wherein the voicemail engine enables management of locally stored voicemail files using the additional data associated with the voicemail files and enables listening to locally stored voicemail files;
    enabling, via the mobile device, the locally stored voicemail file on the mobile device to be available through the additional data to an application on the mobile device other than the voicemail engine.

2. The method as recited in claim 1, further comprising synchronizing the locally stored voicemail file to a cloud-based user account.

3. The method as recited in claim 1, further comprising forwarding the locally stored voicemail file to a contact based on a voicemail forwarding configuration.

4. The method as recited in claim 1, wherein the application other than the voicemail application comprises an email application.

5. The method as recited in claim 1, wherein the application other than the voicemail application comprises a calendar application.

6. The method as recited in claim 1, wherein the additional data comprises contact data, social-network data, messaging-application data, pictures, video clips, other voicemail files, or synchronization data.

7. The method as recited in claim 6, further comprising exposing the locally stored voicemail file via the associated data for local processing.

8. The method as recited in claim 1, wherein enabling management further comprises enabling via the voicemail engine searching, sorting, filtering or navigating the locally stored voicemail file.

9. One or more computer readable storage memories encoded with instructions that, responsive to execution, direct a mobile device to perform operations comprising:
    receiving, at the mobile device, a voice call from a remote entity;
    a voicemail engine recording audio of the voice call to provide a voicemail file;
    the voicemail engine storing the voicemail file on the mobile device;
    the voicemail engine associating additional data with the voice mail file, wherein the voicemail engine enables management of voicemail files using the additional data, and enables listening to voicemail files; and
    enabling, via the mobile device, the stored voicemail file on the mobile device to be available through the additional data to an application on the mobile device other than the voicemail engine.

10. The one or more computer readable storage memories as recited in claim 9, the operations further comprising synchronizing the stored voicemail file to a cloud-based user account.

11. The one or more computer readable storage memories as recited in claim 9, the operations further comprising sending the stored voicemail file to cloud-based storage.

12. The one or more computer readable storage memories as recited in claim 9, wherein the application other than the voicemail application comprises a task management application that associates the stored voicemail file with one or more tasks.

13. The one or more computer readable storage memories as recited in claim 9, the operations further comprising sending the stored voicemail file to Internet-based storage.

14. The one or more computer readable storage memories as recited in claim 9, the operations further comprising sending the stored voicemail file as a MMS message.

15. The one or more computer readable storage memories as recited in claim 9, wherein the additional data comprises at least one of contact information, calendar information, schedule information, or call history information.

16. The one or more computer readable storage memories as recited in claim 15, enabling management of the stored voicemail file comprises searching, sorting, filtering or navigating the locally stored voicemail file.

17. A mobile device comprising:
    a wireless network interface;
    computer-readable storage memory; and
    a voicemail engine configured to:
        answer a voice call received via the wireless network interface;
        store a voicemail file that includes audio of the voice call on the computer-readable storage memory;
        associate additional data with the voicemail file;
        enable management of voicemail files using the additional data and enable listening to voice mail files; and
        enable the stored voicemail file to be available through the additional data to an application on the mobile device other than the voicemail engine.

18. The mobile device of claim 17, wherein the voicemail engine is further configured to send the stored voicemail file to cloud-based storage.

19. The mobile device of claim 17, wherein the voicemail engine is further configured to forward the stored voicemail file as a MMS message.

20. The mobile device of claim 17, wherein the additional data comprises contact data, social-network data, messaging-application data, pictures, video clips, other voicemail files, or synchronization data.

\* \* \* \* \*